Figure 1:
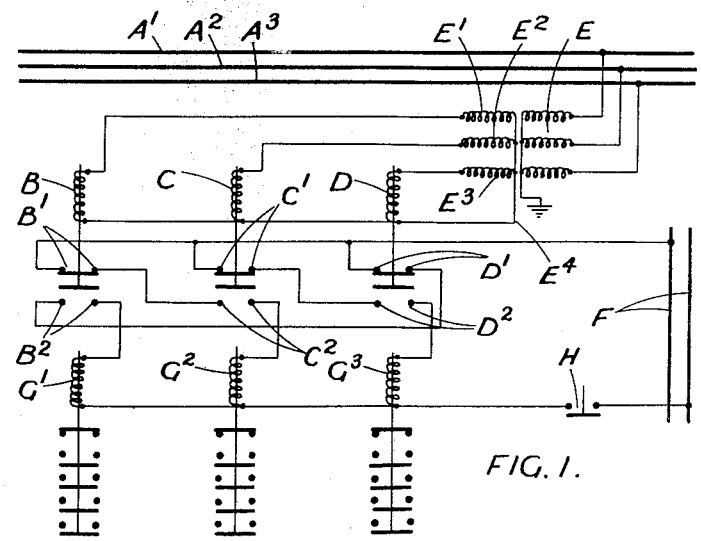

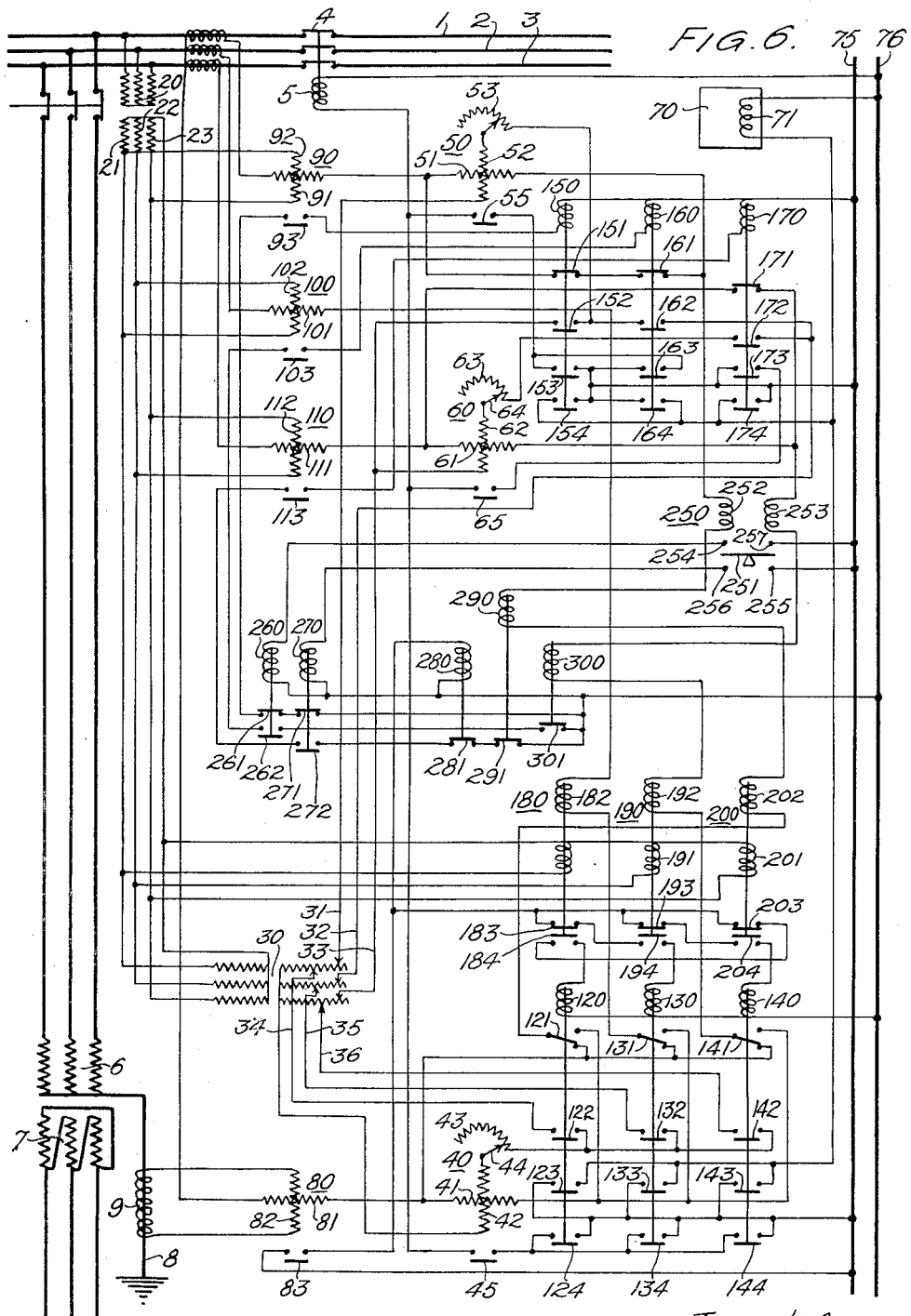

Patented Sept. 12, 1933

1,926,547

UNITED STATES PATENT OFFICE 1,926,547

ELECTRIC PROTECTIVE SYSTEM

Henry Leben, Harrow, England, assignor to A. Reyrolle & Company Limited, Hebburn-on-Tyne, England, a registered company of Great Britain Application March 19, 1931, Serial No. 523,913, and in Great Britain April 10, 1930

17 Claims. (Cl. 175—294)

This invention relates to electric protective systems for three-phase circuits of the kind generally known as impedance or like protective systems, which depend for their operation on the fact that the impedance or reactance or resistance of the protected line between the fault and the protective relay is approximately proportional to the distance of the fault from the relay. In such systems a number of protective "time-discriminating" relays or groups of time-discriminating relays are disposed at the ends of sections of the protected line, such relays being employed to give discriminative protection for the sections by so arranging them that the time of operation of each relay is proportional to the impedance or other ratio of the line. It is usual in such systems for the time-discriminating relays to be normally disconnected and to be brought into circuit on the occurrence of a fault by means of initiating relays, but with the minimum number of initiating relays (namely one for earth faults and three for interphase faults) there is risk of inadvertent relay operation owing to the connection of the time-discriminating relay coils to healthy phases instead of to the faulty phase or phases.

The present invention has for its object to provide simple and satisfactory phase-selecting means for ensuring that the time-discriminating relay coils in a system of the above kind when connected into circuit are energized from the faulty phase or phases.

Various phase-selecting arrangements have already been proposed in which the determination of the correct phase or phases for energizing the time-discriminating relay coils is effected by comparing the voltages or currents in the various phases in one or more differential or balanced phase-selecting relays. In such arrangements earth faults and interphase faults are preferably dealt with separately, a separate phase-selecting relay or group of relays being provided for each of the two kinds of fault. It will be appreciated however that it is of great importance that the fault should be cleared with a minimum time-delay, and it has been found that the differential or balanced type of relay necessary in the known phase-selecting arrangements does not operate sufficiently quickly for the purpose, at least in the case of earth-faults.

The phase-selecting arrangement according to the present invention comprises three phase-selecting relays of the electro-magnetic "lift-and-fall" type each energized in accordance with the earth voltage on one phase of the protected circuit (in the case of an earth-fault phase-selecting arrangement) or in accordance with the voltage between two of the phases of the protected circuit (in the case of an interphase-fault phase-selecting arrangement), the contacts of the three relays being so interconnected that the operation of each relay is rendered ineffective in the event of the simultaneous operation of the next relay in a predetermined phase sequence. Conveniently each phase-selecting relay is normally energized but operates when the appropriate voltage falls below a predetermined value and thereby opens a set of normally closed contacts and closes a set of normally open contacts. The phase-selecting relays may themselves directly control the energizing circuits of the time-discriminating relay coils, but it will usually be preferable, in order to avoid a complicated contact arrangement, for this control to be effected through the medium of auxiliary D. C. contactors.

Thus an earth-fault phase-selecting arrangement according to the invention may comprise a potential transformer on the protected circuit having a star-connected secondary, three phase-selecting relays respectively connected between the three phases of the potential transformer secondary and the star-point, and three auxiliary D. C. contactors each of which is associated with one of the phase-selecting relays and has its energizing circuit controlled by normally open contacts on the associated phase-selecting relay and by normally closed contacts on the next phase-selecting relay, the contacts of the three auxiliary D. C. contactors controlling the energizing circuits of the coils of a single earth-fault time-discriminating relay.

A generally analogous arrangement may be employed for interphase-fault phase selection with the appropriate change in the energizing circuits of the three phase-selecting relays, but in this case in order to provide for three-phase fault conditions each phase-selecting relay is preferably provided with a further set of normally open contacts, these three sets of contacts being connected in series with one another in an alternative energizing circuit for one of the auxiliary D. C. contactors.

The above-described arrangement, whilst being applicable to the protection of other circuits, has been especially designed for the case of a transmission line fed from a generator having its neutral point earthed through a resistance. In some transmission systems however the neutral point is earthed directly instead of through a resistance, and in such cases it has been found that the above arrangement may in certain circumstances fail to operate correctly. This difficulty can be obviated however by so modifying the arrangement that the fault current is utilized to assist in preventing operation of the next relay in the phase sequence. This may be effected in various ways, but in a preferred arrangement each phase-selecting relay is provided with an auxiliary winding energized from the current flowing in the phase associated with the preceding relay in the sequence.

Figure 2:
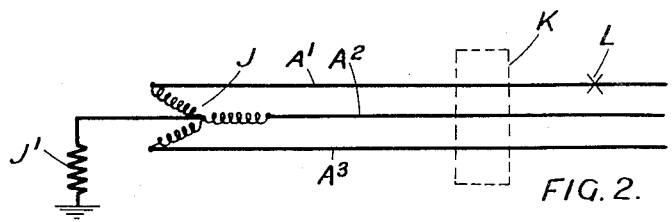
Figure 3:
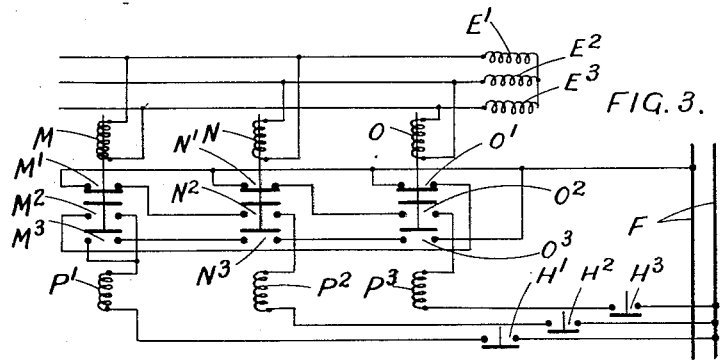
Figure 4:
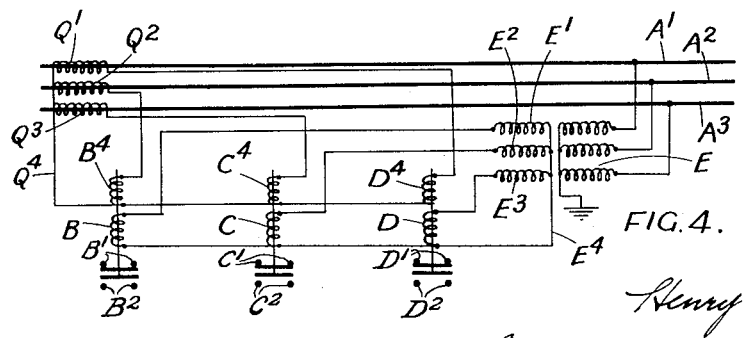
Figure 5:
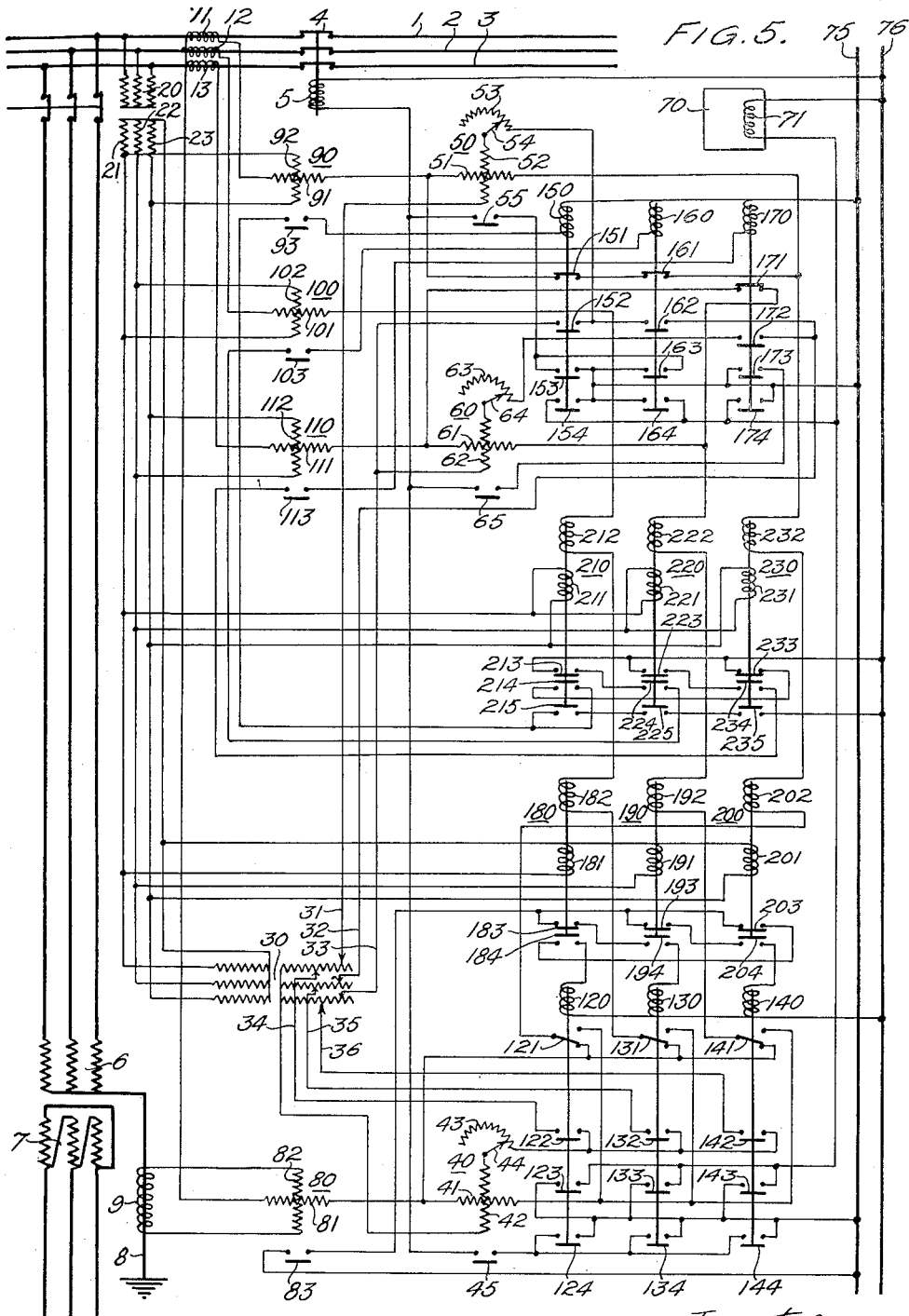

Some convenient phase-selecting arrangements according to the invention are illustrated diagrammatically in the accompanying drawings, in which Figure 1 shows an earth-fault phase-selecting arrangement, Figure 2 illustrates a simple form of transmission line to which a protective system incorporating the phase-selecting arrangement of Figure 1 is especially applicable, Figure 3 shows an interphase-fault phase-selecting arrangement analogous to the arrangement of Figure 1, Figure 4 is a modified form of the earth-fault phase-selecting arrangement of Figure 1, Figure 5 illustrates a complete protective system incorporating the earth-fault phase-selecting arrangement of Figure 4 in association with a generally analogous interphase-fault phase-selecting arrangement, and Figure 6 is a preferred modification of the system of Figure 5 employing a different interphase-fault phase-selecting arrangement.

In the arrangement of Figure 1 three phase-selecting relays B, C, D are employed, one associated with each phase of the protected circuit $A^1$ $A^2$ $A^3$. Each phase-selecting relay consists of a single coil B (or C or D) wound on a magnetic core, the armature of which bridges one pair of contacts $B^1$ (or $C^1$ or $D^1$) when the coil is energized and another pair of contacts $B^2$ (or $C^2$ or $D^2$) when the coil is deenergized. The operating coil of each phase-selecting relay is connected on one side to the star-point $E^4$ of the secondary $E^1$ $E^2$ $E^3$ of a potential transformer whose primary E is connected to the protected circuit $A^1$ $A^2$ $A^3$ and on the other side to the free end of the potential transformer secondary winding $E^1$ (or $E^2$ or $E^3$) in the associated phase. Each phase-selecting relay is thus energized in accordance with the earth voltage on the associated phase of the protected circuit, and is so set that its armature is normally lifted but falls when the corresponding voltage falls below a predetermined value. It should be mentioned that a relay of the simple electromagnetic type described is exceedingly quick in operation and may actually be made to operate in favourable circumstances in as short a time as a fiftieth of a second.

The contacts of the three phase-selecting relays control the energizing circuits from a D. C. source of E. M. F. F of three auxiliary D. C. contactors $G^1$ $G^2$ $G^3$, one for each phase. The energizing circuit of each D. C. contactor includes in series, in addition to the contacts H of an earth-fault initiating relay (operative whenever an earth fault occurs), the normally open contacts of the phase-selecting relay in the corresponding phase and the normally closed contacts on the next phase-selecting relay in a predetermined phase sequence. Thus the D. C. contactor $G^1$ in phase $A^1$ will be controlled by the normally open contacts $B^2$ on the phase-selecting relay B in phase $A^1$ and by the normally closed contacts $D^1$ on the phase-selecting relay D in the leading phase $A^3$.

Thus taking the case of a simple transmission line (see Figure 2) fed from a generator J having its neutral point earthed through a resistance $J^1$, if a fault to earth occurs at say the point L on phase $A^1$ on the side of the protective relay station (indicated at K) remote from the generator J, the current in the phase $A^1$ will lag behind the voltage in that phase, and the voltage in the phase $A^1$ will fall by an amount corresponding to the voltage drops due to the current in the phase $A^1$ in the part of the circuit between the protective relay station K and the generator J and in the generator neutral connection $J^1$. The voltage drop in the generator neutral connection $J^1$ will also affect the voltages on the other two phases, that in the lagging phase $A^2$ being reduced slightly and that in the leading phase $A^3$ being slightly increased. It will thus be apparent that on the occurence of such a fault, the phase-selecting relay B in phase $A^1$ will operate and the relay D in phase $A^3$ will remain inoperative, whilst the relay C in phase $A^2$ may or may not operate in accordance with the severity of the fault. If the phase-selecting relay B in phase $A^1$ alone operates, the corresponding D. C. contactor $G^1$ will be energized but the other two D. C. contactors $G^2$ $G^3$ will remain deenergized. If on the other hand the phase-selecting relays B C in phases $A^1$ and $A^2$ operate, the D. C. contactor $G^1$ in phase $A^1$ will still operate since it is unaffected by the contacts of the phase-selecting relay C in phase $A^2$, but the D. C. contactor $G^2$ in phase $A^2$ will remain inoperative owing to the fact that its energizing circuit is broken at contacts $B^1$ by the operation of the phase-selecting relay B in phase $A^1$. Thus in either event the only contactor to operate will be that associated with the faulty phase $A^1$. Exactly similar considerations apply to the case of earth faults on the other phases, and it will be appreciated that the arrangement is such as to ensure that in the event of an earth fault only the contactor in the faulty phase will be energized.

Each D. C. contactor $G^1$ or $G^2$ or $G^3$ is provided with a number of contacts which control the energizing circuits of the coils of a single earth-fault time-discriminating relay and such other associated circuits as may be required. Details of such circuits will be described later with reference to Figures 5 and 6.

It should be mentioned that, although on the majority of known systems the effect of an earth fault on one phase is as above described, it is possible to have a system which is such that the voltage on the lagging phase increases and that on the leading phase decreases on the occurrence of a fault. Such a case can readily be dealt with by interconnecting the phase-selecting relay contacts in the opposite phase sequence.

The earth-fault phase-selecting arrangement above described may be employed in conjunction with a generally similar interphase-fault phase-selecting arrangement or alternatively (as is in some cases more convenient) with an interphase-fault phase-selecting arrangement arranged in the manner described in applicant's British Patent No. 341,985, complete accepted January 29, 1931, in which a single phase-selecting relay device of the differential or balanced type is employed with its two operating coils energized respectively in accordance with the currents in two of the phases of the protected circuit.

In the former case (shown in Figure 3) the interphase-fault phase-selecting arrangement may comprise three phase-selecting relays M N O of the simple electromagnetic type above described, whose operating coils are respectively energized from the potential transformer secondary windings $E^3 E^1$, $E^1 E^2$, $E^2 E^3$. Each phase-selecting relay has normally open and normally closed contacts $M^2 M^1$ (or $N^2 N^1$ or $O^2 O^1$) which are interconnected in the manner above described for earth-fault phase-selection with the contacts of the other relays in the energizing circuits of auxiliary D. C. contactors $P^1 P^2 P^3$, and in addition is provided with a further pair of contacts $M^3$ (or $N^3$ or $O^3$) which are open when the relay is energized. These further contacts $M^3 N^3 O^3$ on the three relays are connected in series with one another in an alternative energizing circuit for one of the three D. C. contactors say $P^1$, and serve to ensure that one D. C. contractor will be operated in the event of a three-phase fault. Three interphase-fault initiating relays are employed and their contacts $H^1 H^2 H^3$ respectively control the energizing circuits of the three D. C. contactors $P^1 P^2 P^3$.

The contacts of the three D. C. contactors $P^1 P^2 P^3$ control the energizing circuits for the current and voltage coils of the interphase-fault time-discriminating relays, and also the tripping circuit and the starting circuit for the timing mechanism controlling the variable resistances of the time-discriminating relays. Although a symmetrical arrangement of three interphase-fault time-discriminating relays respectively controlled by the three D. C. contactors may be employed, it is possible to effect the desired result with two such relays only, one of these relays dealing with faults between phases $A^1$ and $A^2$ or between phases $A^1$ and $A^3$ whilst the other deals with faults between phases $A^2$ and $A^3$. Details of such circuits will be described later with reference to Figure 5.

Figure 4 shows a modification of the arrangement of Figure 1 to deal with the case of a transmission line in which the generator neutral point is earthed directly, instead of through the resistance $J^1$ (Figure 2). In this case there will be no voltage drop in the neutral connection on the occurrence of an earth fault. Consequently, when such a fault occurs, the voltages on the leading and lagging phases will neither of them increase, and on the contrary will sometimes fall slightly. This effect may possibly give rise to incorrect operation of the phase-selecting arrangement. This difficulty is fully met in the modification of Figure 4, which differs from the arrangement of Figure 1 solely in the fact that each of the phase-selecting relays B (or C or D) is provided with an auxiliary winding $B^4$ (or $C^4$ or $D^4$). These auxiliary windings need consist of a few turns only and are energized from the star-connected secondaries $Q^1 Q^2 Q^3$ of current transformers on the protected lines $A^1 A^2 A^3$, the winding $B^4$ being connected between the secondary $Q^2$ and the star-point $Q^4$, the winding $C^4$ between the secondary $Q^3$ and the star-point $Q^4$, and the winding $D^4$ between the secondary $Q^1$ and the star-point $Q^4$. It is of course essential that the auxiliary winding shall be connected up in the correct sense in order that the total flux in the relay core shall be increased. Thus for instance in the case of an earth-fault on phase $A^1$, the auxiliary winding $D^4$ is strongly energized and effectively prevents the armature of the relay D from opening the contacts $D^1$, so that the proper energization of the contactor $C^1$ is ensured by the deenergization of the relay B. It is immaterial whether the relay C operates or not, since it cannot complete an operative circuit when relay B is deenergized and relay D is energized.

A modification exactly analogous to that shown in Figure 4 may also be employed for the interphase-fault phase-selecting arrangement of Figure 3. In this connection it must be remembered that the current in phase $A^1$ is associated with the interphase voltage $A^3 A^1$, the current in phase $A^2$ with the voltage $A^1 A^2$, and the current $A^3$ with the voltage $A^2 A^3$. Consequently, when auxiliary current windings are provided on the relays M N O of Figure 3, that on relay M will be energized from phase $A^2$, that on relay N from phase $A^3$ and that on relay O from phase A. An interphase-fault phase-selecting arrangement modified in this manner is incorporated in the arrangement of Figure 5 shortly to be described.

It will be appreciated that with this modification, whether applied to the earth-fault arrangement of Figure 1 or to the interphase-fault arrangement of Figure 3, the interconnection of the currents and voltages must correspond with the interconnection of the relay contacts. Thus in the preferred arrangement each relay has a set of normally open contacts and a set of normally closed contacts, of which the former are associated with the same phase or phases as the voltage winding of the relay, whilst the latter are associated with the same phase as the current winding of the relay.

In the complete protective system shown in Figure 5, the protected feeder 1, 2, 3 is controlled by a circuit breaker 4 operated by a trip coil 5 and in the example illustrated has a power transformer 6, 7 T'd to it, the neutral point of the star-connected primary 6 being earthed at 8. The feeder is provided with a group of current transformers, whose secondaries 11, 12, 13 are star-connected at 14, and also with a potential transformer having star-connected primary windings 20 and star-connected secondary windings 21, 22, 23. These transformers provide energizing current for some of the relays employed in the arrangement, but since it is preferable for certain of these relays to be supplied with reduced voltages an auxiliary potential transformer 30 may conveniently be provided, whose primary is energized from the main potential transformer secondaries 21, 22, 23, while the secondary windings have two sets of tappings 31, 32, 33 and 34, 35, 36.

The protection is afforded by means of three time-discriminating relays 40, 50, 60. Each of these relays is preferably of the kind described in U. S. patent application Serial No. 371,484, filed June 17, 1929 and standing in the names of the present applicant and another, having current and voltage coils 41, 42 (or 51, 52 or 61, 62) and a variable resistance 43 (or 53 or 63) in the circuit of, say, the voltage coils. The resistances 43, 53, 63 are controlled by contact arms 44, 54, 64 driven by constant speed timing mechanism, such for example as clockwork mechanism (indicated at 70) electro-magnetically controlled by a coil 71 energized from D. C. control bus-bars 75, 76. The contacts 45, 55, 65 of the three time-discriminating relays control the circuit to the circuit-breaker trip coil 5. One of the time-discriminating relays 40 deals with earth faults, while the other two 50, 60 deal with interphase faults. The energizing current for the current coil 51 of the relay 50 is derived from the current transformer 11 in phase 1 and that for the current coil 61 of the relay 60 from the current transformer 13 in phase 3, while the current coil 41 of the earth fault time-discriminating relay 40 is energized from the residual current through the neutral point connection 14 of the current transformer secondaries, these circuits including other apparatus to be referred to in detail later. The voltage coil 52 of the relay 50 is connected on one side to the tapping 31 of the auxiliary potential transformer 30 and on the other side to one or other of the tappings 32, 33, and the voltage coil 62 of the relay 60 is energized from the tappings 32, 33. Thus the time-discriminating relay 50 can deal with interphase faults between phases 1 and 2 or between phases 1 and 3, while the relay 60 deals with interphase faults between phases 2 and 3. The voltage coil 42 of the earth fault time-discriminating relay 40 is energized in accordance with the earth voltage on the faulty phase, the energizing current being derived from one or other of the reduced voltage tappings 34, 35, 36 on the auxiliary potential transformer 30.

The time-discriminating relay coils are normally out of circuit but are brought into circuit by means of initiating relays (preferably of the kind described in U. S. patent application Serial No. 377,563, filed July 11, 1929 and standing in the names of the present applicant and another), four such initiating relays 80, 90, 100, 110 being employed. The initiating relay 80 deals with earth faults, its current coil 81 being connected in series with the current coil 41 of the earth fault time-discriminating relay 40, while its voltage coil 82 is energized from a current transformer 9 on the neutral earth connection 8 from the primary of the power transformer 6, 7. The initiating relay 90 deals with interphase faults between phases 1 and 3, its current coil 91 being energized from the current transformer secondary 11 and its voltage coil 92 from the potential transformer secondaries 21, 23. The initiating relay 100 deals with interphase faults between phases 1 and 2, its current coil 101 being energized from the secondary 12 and its voltage coil 102 from the secondaries 21, 22. The initiating relay 110 deals with interphase faults between phases 2 and 3, its current coil 111 being energized from the secondary 13 and its voltage coil 112 from the secondaries 22, 23.

The four initiating relays control the circuits of the time-discriminating relay coils through auxiliary D. C. contactors. Thus the contacts 83 of the earth fault initiating relay 80 control the energizing circuits of three D. C. contactors 120, 130, 140 each of which has a change-over contact 121 or 131 or 141 and three normally open contacts 122, 123, 124 or 132, 133, 134, or 142, 143, 144. The three change-over contacts 121, 131, 141 normally complete the energizing circuit of the current coil 81 of the initiating relay 80 from the current transformer secondaries 11, 12, 13, the current coil 41 of the earth fault time-discriminating relay 40 being out of circuit, but when any one of the contactors operates the current coil 41 is connected up to one of the three secondaries 11, 12, 13 in accordance with which contactor has operated. In a similar manner the normally disconnected voltage coil 42 of the earth fault time-discriminating relay is brought into circuit with one of the three reduced voltage tappings 34, 35, 36 on the auxiliary potential transformer by the closing of one of the contacts 122, 132, 142. The contacts 123, 133, 143 are connected in parallel and control the energizing circuit of the control coil 71 of the timing mechanism 70, while the contacts 124, 134, 144 are also connected in parallel to prepare the circuit to the trip coil 5 in readiness for the operation of the earth fault time-discriminating relay contacts 45 after the appropriate time interval.

The contacts 93, 103, 113 of the three interphase fault initiating relays respectively control the energizing circuits of three further auxiliary D. C. contactors 150, 160, 170, each having a normally closed contact 151 or 161 or 171 and three normally open contacts 152, 153, 154 or 162, 163, 164 or 172, 173, 174. The contacts 151 and 161 are connected in series with one another and normally short-circuit the current coil 51 of the time-discriminating relay 50, while the contact 171 normally short-circuits the current coil 61 of the time-discriminating relay 60. The three contacts 152, 162, 172 control the connections of the voltage coils 52, 62 of these two time-discriminating relays from the tappings 31, 32, 33 of the auxiliary potential transformer. The contacts 153, 163 prepare the circuit to the trip coil 5 in readiness for the operation of the time-discriminating relay 50 and the contact 173 similarly prepares the circuit for the operation of the relay 60. The contacts 154, 164, 174 all control the energizing circuit of the control coil 71 of the timing mechanism 70.

It is to be noted that the contacts 83, 93, 103, 113 correspond generally to the contacts H, H$^1$, H$^2$, H$^3$ of Figures 1 and 3 and the contactors 120, 130, 140, 150, 160, 170 to the contactors G$^1$, G$^2$, G$^3$, P$^1$, P$^2$, P$^3$ of those figures. The determination as to which of the contactors 120, 130, 140 shall be operative is effected by three earth-fault phase-selecting relays 180, 190, 200 arranged generally after the manner of the relays B B$^4$, C C$^4$, D D$^4$ of Figure 4, and the contactors 150, 160, 170 are controlled in a similar manner by three interphase-fault phase-selecting relays 210, 220, 230. The relay 180 has a voltage coil 181 energized from the potential transformer secondary 21 and a current coil 182 energized from the current transformer secondary 12 and operates contacts 183, 184. The relay 190 has its voltage and current coils 191, 192 energized respectively from the potential and current transformer secondaries 22, 13 and operates contacts 193, 194. The relay 200 has its voltage and current coils 201, 202 energized respectively from the secondaries 23, 11 and operates contacts 203, 204. The contacts 203, 184 are connected in series and control the energizing circuit of the contactor 130, and the contactors 130 and 140 are similarly controlled respectively by the contacts 183, 194 and 193, 204, these circuits all being controlled also by the earth-fault initiating relay contact 83.

The interphase-fault phase-selecting relay 210 has a voltage coil 211 energized from the potential transformer secondaries 21, 23 and a current coil 212 energized from the current transformer secondary 12 and operates contacts 213, 214, 215. The relay 220 has its voltage and current coils 221, 222 energized from the potential transformer secondaries 21, 22 and the current transformer secondary 13 and operates contacts 223, 224, 225. The voltage and current coils 231 and 232 of the relay 230, having contacts 233, 234, 235 are energized from the secondaries 22, 23 and 11. The contacts 233 and 214 are in series with one another and with the initiating relay contact 93 to control the energizing circuit of the contactor 150. The energizing circuits of the contactors 160 and 170 are similarly controlled respectively by the contacts 213, 224, 103 and by the contacts 223, 234, 113. The three contacts 215, 225, 235 are connected in series with one another in an alternative energizing circuit for the contactor 150 through the initiating relay contact 93.

The manner in which these phase-selecting relays control the operation of the various contactors will be clear from the descriptions of the arrangements of Figures 1—4 given above.

Figure 6 shows an alternative arrangement, which is in some cases found more convenient, wherein an earth-fault phase-selecting arrangement according to the present invention is employed in conjunction with an interphase-fault phase-selecting arrangement arranged in the manner described in British Patent No. 341,985, in which a single phase-selecting relay device of the differential or balanced type is employed with its two operating coils energized respectively in accordance with the currents in two of the phases of the protected circuit.

Apart from the omission of the interphase-fault phase-selecting relays 210, 220, 230 and the substitution therefor of the phase-selecting arrangement now to be described, Figure 6 is identical with Figure 5 and the same reference numerals are employed for the corresponding parts.

The primary element of the interphase-fault phase-selecting arrangement shown in Figure 6 consists of a phase-selecting relay 250 comprising a contact-making system 251 (which may be in the form of a pivoted beam or a rotatable spindle) operated differentially by two coils 252, 253 energized respectively from the current transformer secondaries 11, 13. The contact member 251 has three operative positions, one of which is occupied normally and also on the occurrence of a fault such that equal currents flow in the phases 1 and 3, while the other two positions are occupied respectively when the current in phase 1 is greater than or is less than that in phase 3. Thus for an interphase fault between phases 1 and 3 or for a three-phase fault the member 251 will occupy the normal balanced position shown. The member 251 will move in one direction to connect the contacts 254, 255 for an interphase fault between phases 1 and 2, and in the opposite direction to connect contacts 256, 257 for an interphase fault between phases 2 and 3. The contacts 254, 255 and 256, 257 respectively control the energizing circuits of two selecting contactors 260 and 270 each having a normally closed contact 261 or 271 and a normally open contact 262 or 272. The two normally closed contacts 261, 271 are connected in series with one another and with the initiating contactor contact 93 to control the energizing circuit of the contactor 150, and the contacts 262 and 272 are respectively connected in series with the contacts 103 and 113 to control the contactors 160 and 170.

Thus for an interphase fault between phases 1 and 3, the phase-selecting relay 250 will leave the selecting contactors 260, 270 deenergized and the closing of contact 93 will energize the contactor 150. For a fault between phases 1 and 2, the phase-selecting relay will close contacts 254, 255 and energize the selecting contactor 260, so that the contactor 160 will be energized by the closing of contacts 103, 162. For a fault between phases 2 and 3 the phase-selecting relay will cause the selecting contactor 270 to close its contact 272, which with the closing of contact 113 will energize the contactor 170. For a three-phase fault contacts 93, 103 and 113 will all close, but only contact 93 will operate its contactor 150, since the phase-selecting relay will leave the selecting contactors 260, 270 deenergized. Thus the phase-selecting relay 250 with its selecting contactors 260, 270 ensures that the interphase-fault time-discriminating relay coils will be correctly energized from the faulty phases even when the fault has been such as to cause more than one of the initiating relays to operate.

It will be appreciated that the phase-selecting relay will also operate in the event of earth faults, but except in certain circumstances, the initiating contactors 90, 100, 110 will remain inoperative for earth faults. In order however to deal with such exceptional circumstances, it is preferable to provide lock-out relays to render inoperative an interphase-fault time-discriminating relay on the occurrence of faults other than those for the clearance of which it is provided. Three such lock-out relays are shown in Figure 6 and their arrangement and operation will now be described.

Thus a severe earth-fault on phase 1 might cause operation of the interphase-fault initiating relay 90, but since the phase-selecting relay 250 would in this case cause contact 261 to open and contact 262 to close incorrect operation would not result. Similarly if a severe earth-fault on phase 2 happens to cause the initiating relay 100 to operate, the phase-selecting relay 250 would remain in its balanced position leaving contact 262 open and thus prevent incorrect operation. On the other hand a severe earth-fault on phase 3 will cause contact 272 to close and since such a fault might also operate the initiating relay 110, it would be possible for the interphase fault time-discriminating relay 60 to be brought incorrectly into circuit by the contactor 170. In order to prevent this a lock-out relay 280 is provided having a normally closed contact 281 in the energizing circuit of the contactor 170, this relay 280 being energized to open its contact whenever the earth-fault initiating relay 80 operates.

Again a fault on the remote side of a power transformer connected to the transmission network external to the protected feeder may disturb the flow of current in such a manner as to cause the interphase-fault initiating relays to operate incorrectly. Any resultant incorrect operation of the interphase-fault time-discriminating relays may however be prevented by the provision of one or more lock-out relays operating on a predetermined degree of overload in one phase to break the energizing circuit of the interphase-fault contactor concerned with faults between the other two phases. Two such lock-out relays 290 and 300 energized respectively from the currents in phases 1 and 3 and operative respectively at their contacts 291 and 301 to break the circuits of the D. C. contactors 170 and 160, in addition to the lock-out relay 280 operative for earth faults will adequately serve to render the system stable against such incorrect operation. It will be appreciated that other arrangements of lock-out relays can be satisfactorily employed to effect the desired result.

It will be appreciated that the above arrangements have been described by way of example only and may be modified in various ways within the scope of the invention.

What I claim as my invention and desire to secure by Letters Patent is:

1. In a three-phase electric protective system having a time-discriminating action dependent on the fault distance, the combination of a circuit-breaker in the protected line, a normally inoperative time-discriminating relay, means whereby such relay when rendered operative acts to open the circuit-breaker after a time interval dependent on a ratio which depends on the voltage and current characteristics of the line and is representative of the fault distance, an initiating relay, means whereby the initiating relay is caused to operate in the event of an earth fault on the line, means whereby the initiating relay on operating causes the time-discriminating relay to be rendered operative, and a phase-selecting arrangement for ensuring that the time-discriminating relay coils are energized from the faulty phase or phases comprising three phase-selecting relays of the electro-magnetic "lift-and-fall" type, means for energizing each phase-selecting relay in accordance with the earth voltage on one phase of the protected line, and means for so interconnecting the contacts of the three phase-selecting relays that the operation of each relay is rendered ineffective in the event of the simultaneous operation of the next relay in a predetermined phase sequence.

2. In a three-phase electric protective system having a time-discriminating action dependent on the fault distance, the combination of a circuit-breaker in the protected line, at least one normally inoperative time-discriminating relay, means whereby each time-discriminating relay when rendered operative acts to open the circuit-breaker after a time interval dependent on a ratio which depends on the voltage and current characteristics of the line and is representative of the fault distance, a group of initiating relays, means whereby at least one initiating relay is caused to operate in the event of an interphase fault on the line, means whereby each initiating relay on operating causes a selected time-discriminating relay to be rendered operative, and a phase-selecting arrangement for ensuring that the time-discriminating relay coils are energized from the faulty phases comprising three phase-selecting relays of the electro-magnetic "lift-and-fall" type, means for energizing each phase-selecting relay in accordance with the voltage between two of the phases of the protected line, and means for so interconnecting the contacts of the three phase-selecting relays that the operation of each relay is rendered ineffective in the event of the simultaneous operation of the next relay in a predetermined phase sequence.

3. In a three-phase electric protective system having a time-discriminating action dependent on the fault distance, the combination of a circuit-breaker in the protected line, a normally inoperative time-discriminating relay, means whereby such relay when rendered operative acts to open the circuit-breaker after a time interval dependent on a ratio which depends on the voltage and current characteristics of the line and is representative of the fault distance, an initiating relay, means whereby the initiating relay is caused to operate in the event of an earth fault on the line, means whereby the initiating relay on operating causes the time-discriminating relay to be rendered operative, and a phase-selecting arrangement for ensuring that the time-discriminating relay coils are energized from the faulty phase or phases comprising three phase-selecting relays of the electro-magnetic "lift-and-fall" type, each relay having a normally open contact and a normally closed contact, three auxiliary contactors respectively associated with the three phase-selecting relays and controlling the supply of energizing current to the time-discriminating relay coils, means for energizing each phase-selecting relay in accordance with the earth voltage on one phase of the protected line, the relay being set to open its normally closed contact and to close its normally open contact when such voltage falls below a predetermined value, and means whereby the energization of each auxiliary contactor is controlled in series by the normally open contact of the associated phase-selecting relay and by the normally closed contact of the next relay in a predetermined phase sequence.

4. In a three-phase electric protective system having a time-discriminating action dependent on the fault distance, the combination of a circuit-breaker in the protected line, at least one normally inoperative time-discriminating relay, means whereby each time-discriminating relay when rendered operative acts to open the circuit-breaker after a time interval dependent on a ratio which depends on the voltage and current characteristics of the line and is representative of the fault distance, a group of initiating relays, means whereby at least one initiating relay is caused to operate in the event of an interphase fault on the line, means whereby each initiating relay on operating causes a selected time-discriminating relay to be rendered operative, and a phase-selecting arrangement for ensuring that the time-discriminating relay coils are energized from the faulty phases comprising three phase-selecting relays of the electro-magnetic "lift-and-fall" type, each relay having a normally open contact and a normally closed contact, three auxiliary contactors respectively associated with the three phase-selecting relays and controlling the supply of energizing current to the time-discriminating relay coils, means for energizing each phase-selecting relay in accordance with the voltage between two of the phases of the protected line the relay being set to open its normally closed contact and to close its normally open contact when such voltage falls below a predetermined value, and means whereby the energization of each auxiliary contactor is controlled in series by the normally open contact of the associated phase-selecting relay and by the normally closed contact of the next relay in a predetermined phase sequence.

5. The combination with the features set forth in claim 4, of further normally open contacts, one on each phase-selecting relay, and means whereby such further normally open contacts on the three phase selecting relays control in series an alternative energizing circuit for one of the auxiliary contactors.

6. The combination with the features set forth in claim 4, of further normally open contacts, one on each phase-selecting relay, means whereby such further normally open contacts on the three phase-selecting relays control in series an alternative energizing circuit for one of the auxiliary contactors, and means whereby on the occurrence of a fault causing the operation of one phase-selecting relay the fault current is utilized to assist in preventing operation of the next phase-selecting relay in the phase sequence.

7. In a three-phase electric protective system having a time-discriminating action dependent on the fault distance, the combination of a circuit-breaker in the protected line, a normally inoperative time-discriminating relay, means whereby such relay when rendered operative acts to open the circuit-breaker after a time interval dependent on a ratio which depends on the voltage and current characteristics of the line and is representative of the fault distance, an initiating relay, means whereby the initiating relay is caused to operate in the event of an earth fault on the line, means whereby the initiating relay on operating causes the time-discriminating relay to be rendered operative, and a phase-selecting arrangement for ensuring that the time-discriminating relay coils are energized from the faulty phase or phases comprising three phase-selecting relays of the electro-magnetic "lift-and-fall" type, each relay having a main operating winding and an auxiliary operating winding, means for energizing the main operating winding of each phase-selecting relay in accordance with the earth voltage on the associated phase of the protected line, means for energizing the auxiliary winding of each phase-selecting relay in accordance with the current flowing in the phase associated with the preceding relay in a predetermined phase sequence, and means for so interconnecting the contacts of the three phase-selecting relays that the operation of each relay is rendered ineffective in the event of the simultaneous operation of the next relay in the phase sequence.

8. In a three-phase electric protective system having a time-discriminating action dependent on the fault distance, the combination of a circuit-breaker in the protected line, at least one normally inoperative time-discriminating relay, means whereby each time-discriminating relay when rendered operative acts to open the circuit-breaker after a time interval dependent on a ratio which depends on the voltage and current characteristics of the line and is representative of the fault distance, a group of initiating relays, means whereby at least one initiating relay is caused to operate in the event of an interphase fault on the line, means whereby each initiating relay on operating causes a selected time-discriminating relay to be rendered operative, and a phase-selecting arrangement for ensuring that the time-discriminating relay coils are energized from the faulty phases comprising three phase-selecting relays of the electro-magnetic "lift-and-fall" type, each relay having a main operating winding and an auxiliary operating winding, means for energizing the main operating winding of each phase-selecting relay in accordance with the voltage between two of the phases of the protected line, means for energizing the auxiliary operating winding of each phase-selecting relay in accordance with the phase current which is associated with the interphase voltage from which the main winding of the preceding relay in a predetermined phase sequence is energized, and means for so interconnecting the contacts of the three phase-selecting relays that the operation of each relay is rendered ineffective in the event of the simultaneous operation of the next relay in the phase sequence.

9. In a three-phase electric protective system having a time-discriminating action dependent on the fault distance, the combination of a circuit-breaker in the protected line, a normally inoperative time-discriminating relay, means whereby such relay when rendered operative acts to open the circuit-breaker after a time interval dependent on a ratio which depends on the voltage and current characteristics of the line and is representative of the fault distance, an initiating relay, means whereby the initiating relay is caused to operate in the event of an earth fault on the line, three phase-selecting relays of the electro-magnetic "lift-and-fall" type respectively associated with the three phases and each having main and auxiliary operating windings and two contacts one normally open and one normally closed, a potential transformer on the protected line having a star-connected secondary, a group of current transformers on the protected line having their secondaries star-connected, means for connecting the main operating winding of each phase-selecting relay between the associated phase of the potential transformer secondary and the star-point thereof, means for connecting the auxiliary winding of each phase-selecting relay between the star-point of the current transformer secondaries and the current transformer secondary on the phase associated with the preceding phase-selecting relay in a predetermined phase sequence, a D. C. source of power, three auxiliary D. C. contactors respectively associated with the three phases, means whereby each D. C. contactor controls the energization of the time-discriminating relay coils from the appropriate phase and acts when operated to render the time-discriminating relay operative, and means whereby the energization of each D. C. contactor from the D. C. source is controlled in series by the initiating relay contact, the normally open contact of the associated phase-selecting relay and the normally closed contact of the next phase-selecting relay in the phase sequence.

10. In a three-phase electric protective system having a time-discriminating action dependent on the fault distance, the combination of a circuit-breaker in the protected line, at least one normally inoperative time-discriminating relay, means whereby each time-discriminating relay when rendered operative acts to open the circuit-breaker after a time interval dependent on a ratio which depends on the voltage and current characteristics of the line and is representative of the fault distance, three initiating relays respectively associated with the three pairs of phases, means whereby each initiating relay is caused to operate in the event of an interphase fault on the line between the two phases with which it is associated, three phase-selecting relays of the electro-magnetic "lift-and-fall" type respectively associated with the three pairs of phases and each having main and auxiliary operating windings and three contacts two normally open and one normally closed, a potential transformer on the protected line, a group of current transformers on the protected line having their secondaries star-connected, means for connecting the main operating winding of each phase-selecting relay between the two phases of the potential transformer secondary with which the relay is associated, means for connecting the auxiliary operating winding of each phase-selecting relay between the star-point of the current transformer secondaries and the current transformer secondary on that phase, the current in which is associated with the interphase voltage between the pair of phases associated with the preceding phase-selecting relay in a predetermined phase sequence, a D. C. source of power, three auxiliary D. C. contactors respectively associated with the three pairs of phases, means whereby each D. C. contactor controls the energization of the coils of a time-discriminating relay from the appropriate phases and acts when operated to render such time-discriminating relay operative, means whereby the energization of each D. C. contactor is controlled in series by the contact of the associated initiating relay, one normally open contact of the associated phase-selecting relay and the normally closed contact of the next phase-selecting relay in the phase sequence, and means whereby the remaining three normally open contacts of the phase-selecting relays control in series an alternative energizing circuit for one of the D. C. contactors.

11. In a three-phase electric protective system having a time-discriminating action dependent on the fault distance, the combination of a circuit-breaker in the protected line, a normally inoperative time-discriminating relay associated with earth faults, at least one normally inoperative time-discriminating relay associated with interphase faults, means whereby each time-discriminating relay when rendered operative acts to open the circuit-breaker after a time interval dependent on a ratio which depends on the voltage and current characteristics of the line and is representative of the fault distance, a group of initiating relays, means whereby at least one initiating relay is caused to operate in the event of a fault on the line, means whereby each initiating relay on operating causes a selected time-discriminating relay to be rendered operative, six phase-selecting relays of the electro-magnetic "lift-and-fall" type, three associated with earth faults and three with interphase faults, means whereby the earth-fault phase-selecting relays act to determine the phase from which the earth-fault time-discriminating relay coils are energized, means whereby the interphase-fault phase-selecting relays act to determine the phases from which the interphase-fault time-discriminating relay coils are energized, means for energizing each earth-fault phase-selecting relay in accordance with the earth voltage on one phase of the protected line, means for energizing each interphase-fault phase-selecting relay in accordance with the voltage between two of the phases of the protected line, means for so inter-connecting the contacts of the three earth-fault phase-selecting relays that the operation of each relay is rendered ineffective in the event of the simultaneous operation of the next relay in a predetermined phase sequence, and means for so inter-connecting the contacts of the three interphase-fault phase-selecting relays that the operation of each relay is rendered ineffective in the event of the simultaneous operation of the next relay in the phase sequence.

12. The combination with the features set forth in claim 11, of means whereby on the occurrence of a fault causing the operation of one phase-selecting relay, the fault current is utilized to assist in preventing operation of the next relay in the phase sequence.

13. In a three-phase electric protective system having a time-discriminating action dependent on the fault distance, the combination of a circuit-breaker in the protected line, a normally inoperative time-discriminating relay associated with earth faults, at least one normally inoperative time-discriminating relay associated with interphase faults, means whereby each time-discriminating relay when rendered operative acts to open the circuit-breaker after a time interval dependent on a ratio which depends on the voltage and current characteristics of the line and is representative of the fault distance, a group of initiating relays, means whereby at least one initiating relay is caused to operate in the event of a fault on the line, means whereby each initiating relay on operating causes a selected time-discriminating relay to be rendered operative, three phase-selecting relays of the electro-magnetic "lift-and-fall" type associated with earth faults, means whereby such phase-selecting relays act to determine the phase from which the earth-fault time-discriminating relay coils are energized, means for energizing each earth-fault phase-selecting relay in accordance with the earth voltage on one phase of the protected line, means for so inter-connecting the contacts of the three earth-fault phase-selecting relays that the operation of each relay is rendered ineffective in the event of the simultaneous operation of the next relay in a predetermined phase sequence, a single interphase-fault phase-selecting relay of the differential type having two operating coils, means whereby such relay acts to determine the phases from which the interphase-fault time-discriminating relay coils are energized, and means for energizing the two operating coils of the interphase-fault phase-selecting relay in accordance respectively with the currents flowing in two of the phases of the protected line.

14. The combination with the features set forth in claim 13, of means whereby on the occurrence of a fault causing the operation of one earth-fault phase-selecting relay, the fault current is utilized to assist in preventing operation of the next relay in the phase sequence.

15. The combination with the features set forth in claim 1, of means whereby on the occurrence of a fault causing the operation of one phase-selecting relay, the fault current is utilized to assist in preventing operation of the next relay in the phase sequence.

16. The combination with the features set forth in claim 2, of means whereby on the occurrence of a fault causing the operation of one phase-selecting relay, the fault current is utilized to assist in preventing operation of the next relay in the phase sequence.

17. The combination with the features set forth in claim 3, of means whereby on the occurrence of a fault causing the operation of one phase-selecting relay, the fault current is utilized to assist in preventing operation of the next relay in the phase sequence.

HENRY LEBEN.